United States Patent [19]
Katsumata et al.

[11] Patent Number: 5,534,934
[45] Date of Patent: Jul. 9, 1996

[54] TELEVISION RECEIVER CAPABLE OF ENLARGING AND COMPRESSING IMAGE

[75] Inventors: Kenji Katsumata; Shigeru Hirahata; Toshinori Murata, all of Yokohama; Haruki Takata, Chigasaki; Shinobu Torikoshi; Takanori Eda, both of Yokohama; Kouichi Ishibashi, Chigasaki, all of Japan

[73] Assignee: Hitachi, Ltd., Tokyo, Japan

[21] Appl. No.: 260,576

[22] Filed: Jun. 16, 1994

[30] Foreign Application Priority Data

Jun. 18, 1993 [JP] Japan ..................... 5-146674

[51] Int. Cl.[6] ........................................... H04N 7/01
[52] U.S. Cl. ................... 348/445; 348/448; 348/556
[58] Field of Search ................... 348/445, 448, 348/458, 441, 556, 555, 561, 581, 582, 580, 913, 571, 704; H04N 7/01

[56] References Cited

U.S. PATENT DOCUMENTS

| | | | |
|---|---|---|---|
| 4,528,585 | 7/1985 | Bolger | 358/22 |
| 4,605,952 | 8/1986 | Powers | 348/445 |
| 4,760,455 | 7/1988 | Nagashima | 358/242 |
| 4,951,149 | 8/1990 | Faroudja | 358/230 |
| 5,021,719 | 6/1991 | Arai et al. | 315/364 |
| 5,243,421 | 9/1993 | Nagata et al. | 348/445 |
| 5,276,515 | 1/1994 | Katsumata et al. | 358/160 |
| 5,283,651 | 2/1994 | Ishizuka | 348/704 |
| 5,343,238 | 8/1994 | Takata et al. | 348/556 |
| 5,351,087 | 9/1994 | Christopher et al. | 348/445 |

FOREIGN PATENT DOCUMENTS

| | | |
|---|---|---|
| 0162501 | 11/1985 | European Pat. Off. . |
| 0514819 | 11/1992 | European Pat. Off. . |
| 0540077 | 5/1993 | European Pat. Off. . |
| 1194784 | 8/1989 | Japan .............. H04N 7/01 |
| 311891 | 1/1991 | Japan .............. H04N 7/01 |
| 66634 | 1/1994 | Japan .............. H04N 7/01 |
| 2079090 | 1/1982 | United Kingdom . |

OTHER PUBLICATIONS

Patent Abstracts of Japan, vol. 12, No. 474, 12 Dec. 1988 & JP-A-63 193 779 (Matsushita Electric Industrial Co., Ltd.) 11 Aug. 1988.

Patent Abstracts of Japan, vol. 13, No. 490, 7 Nov. 1989 & JP-A-01 194 784 (Matsushita Electric Industrial Co., Ltd.) 4 Aug. 1989.

*Primary Examiner*—Safet Metjahic
*Attorney, Agent, or Firm*—Kenyon & Kenyon

[57] ABSTRACT

To provide an image which is matched with an aspect ratio of a screen of a display unit by compressing and enlarging the whole of the image to a desired size. A video signal is sequentially written into a field memory in response to a write clock from an input terminal. A clock generating circuit supplies the field memory with a read clock having a frequency which is about 4/3 times as high as that of the write clock. A vertical enlargement control circuit reads a video signal from the field memory with a line period corresponding to a magnification factor and inhibits writing to a one-line memory with the same period to provide a line delayed output for an output signal from the field memory. A vertical interpolating circuit generates a scanning line signal by an interpolation operation in accordance with a control signal from the vertical enlargement control circuit.

6 Claims, 8 Drawing Sheets

FIG. 8A
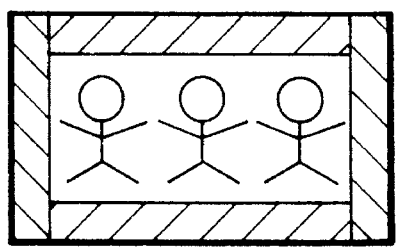
3/2 TIMES     4/3 TIMES
FIG. 8E     FIG. 8B
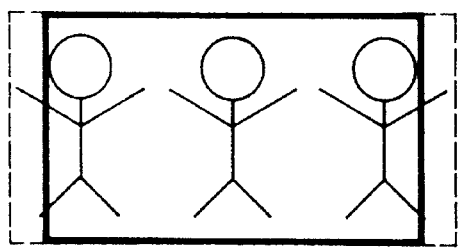     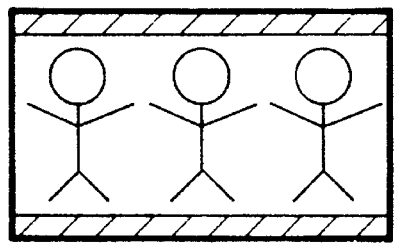
FIG. 8F     FIG. 8C
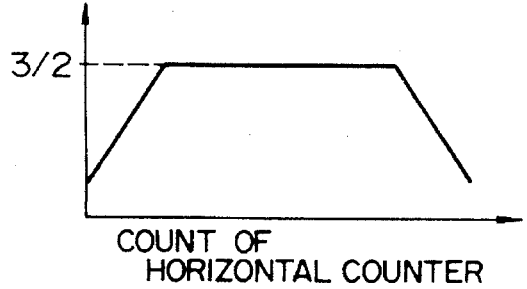     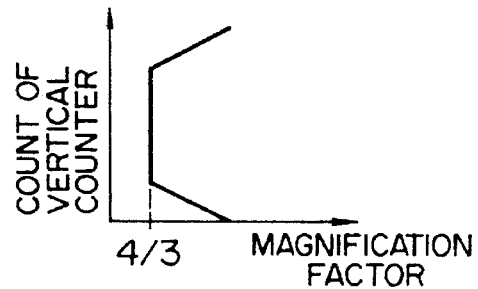
FIG. 8G     FIG. 8D
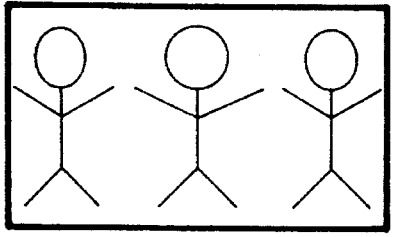

FIG. 10A
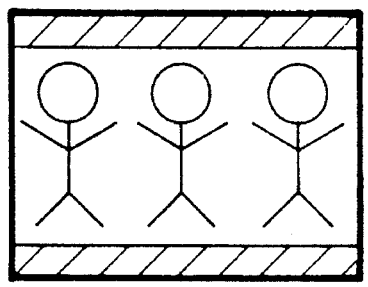
FIG. 10B
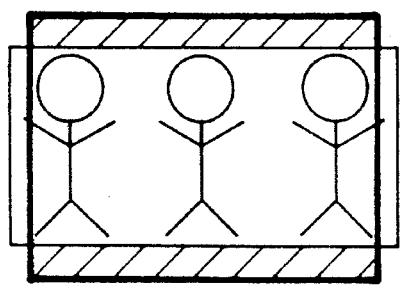
VERTICAL, HORIZONTAL ENLARGEMENT
FIG. 10C
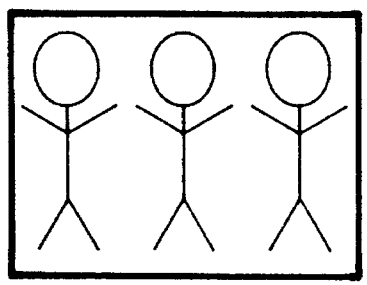
VERTICAL ENLARGEMENT AT UPPER AND LOWER SIDE AREAS
HORIZONTAL COMPRESSION AT LEFT AND RIGHT SIDE AREAS
FIG. 10D
| ⓓ | ⓑ | ⓓ |
|---|---|---|
| ⓒ | ⓐ | ⓒ |
| ⓓ | ⓑ | ⓓ |
ⓐ NO DISTORTION
ⓑ ELONGATION AT UPPER AND LOWER SIDE AREAS
ⓒ CONTRACTION AT RIGHT AND LEFT SIDE AREAS
ⓓ ELONGATION AT UPPER AND LOWER SIDE AREAS, CONTRACTION AT RIGHT AND LEFT SIDE AREAS

TELEVISION RECEIVER CAPABLE OF ENLARGING AND COMPRESSING IMAGE

BACKGROUND OF THE INVENTION

1. Field of the Invention

The present invention relates to digital processing of a video signal and in particular to an image compressing and enlarging circuitry which is capable of displaying an image on a screen without an apparent disparity between the image and the screen by compressing or enlarging an image to a desired size to match the aspect ratio of the screen of a display even if the aspect ratio of the image obtained by a video signal is different from the aspect ratio of the screen of the display.

2. Description of the Related Art

Test broadcasting of high definition TV started in 1991 in Japan and the home TV sets with a screen having an aspect ratio of 16:9 have been used. Matching the TV sets that have a screen having an aspect ratio of 16:9 with the conventional TV broadcasting is critical. Thus how the aspect ratio of the image of the broadcast is changed into 16:9 is an important problem. If an image having movie size which is commonly found in a number of recent movie software packages, that is, so-called letter box type image (the aspect ratios of the image are various) in which the aspect ratio of the whole image is 4:3 and there are blanking areas on upper and lower sides of a screen is displayed on a display with a screen having an aspect ratio of 16:9, an aspect ratio which is approximate to 16:9 could be obtained by enlarging the image in a vertical direction. Therefore, enlargement of images in a vertical direction has become a critical technology.

JP-A-1-194784 discloses a combined method including a method of adapting an image having an aspect ratio of 4:3 onto a screen having an aspect ratio of 16:9 by changing the write frequency of a line memory and the read frequency thereof to compress the image in a horizontal direction and a method of enlarging the image in a vertical direction by changing the amplitude of an output of the deflecting circuit for cutting the upper and lower areas of the image.

JP-A-3-11891 discloses a technology for enlarging an image in a vertical direction by digital signal processing. The proposed circuit configuration for interpolating scanning lines using digital signal processing to enlarge the image in a vertical direction is shown in FIG. 1.

In FIG. 1, reference numerals 201 and 202 denote input and output terminals of digitized video signal, respectively; 203 a memory having a capacity of at least about 120 lines; 204 one-line memory; 205 and 206 ROM tables which are used for multiplying an input signal by a coefficient; 207 an adder; 208 an input terminal for a control signal for the memory 203; 209 an input terminal for a control signal for switching tables of the ROMs 205 and 206.

In the disclosed invention, the memory 203 is controlled to conduct reading of the same line plural times with a predetermined line period in accordance with a control signal from the input terminal 208. As a result of delay of a video signal by one line in the one-line memory 204, scanning line signals of adjacent upper and lower lines are supplied to the ROMs 205 and 206 and are multiplied by a coefficient in a ROM table which is selected by a control signal from the input terminal 209. A signal having a suitable center of gravity of scanning lines can be obtained from the adder 207.

The thus obtained enlarged image provide a large size picture displayed with high quality since the spacings between scanning lines when progressive scanning signals are used are less changed in comparison with a case in which the image are enlarged by changing the amplitude of the output of the deflecting circuit.

In such a manner, various techniques have been used to display an image having an aspect ratio of 4:3 on a screen having an aspect ratio of 16:9.

The above mentioned two inventions are excellent as systems for displaying an image having an aspect ratio of 4:3 on a screen having an aspect ratio of 16:9. However, letter box type image of movie software which are commonly found in recent software packages have various aspect ratios. It has become harder to change an image having various aspect ratios to an optimum size for displays having an aspect ratio of 16:9.

It is necessary to display a framing signal particularly in projector type displays when most images having an aspect ratio of 4:3 are compressed and displayed. A problem of a sticking of the display screen or a difference in luminescence decay of a phosphor may occur. Accordingly, a method of displaying no framing signal is required.

SUMMARY OF THE INVENTION

It is an object of the present invention to provide an image compressing and enlarging circuit which is capable of providing an image having a size which is matched with the aspect ratio of a screen of a display by compressing and enlarging the whole of the image to a desired size.

It is another object of the present invention to provide an image compressing and enlarging circuit which is capable of providing an image that is matched with the aspect ratio of a screen of a display by partially compressing and enlarging the image.

The above mentioned object of the present invention is accomplished by providing an image compressing and enlarging circuit comprising memory means which can be controlled on a line-by-line basis, vertical enlargement control means for controlling the memory means to read the same line plural times with a line period corresponding to a preset magnification factor; horizontal enlargement control means for controlling the memory means to read the same pixel plural times with a pixel period corresponding to the preset magnification factor; clock generating means for generating a read clock having a frequency not less than that of a write clock from the write clock of said memory means; and combining means for combining output signals from said horizontal and vertical enlargement control means with an output signal from said clock generating means.

The input video signal is written into said memory means in response to said write clock. At this time, the input video signal is managed on a line-by-line basis. On the other hand, the vertical enlargement control means determines the line period associated with reading from said memory means in accordance with a preset magnification factor by performing an operation and outputs a control signal. Similarly, the horizontal enlargement control means determines the pixel period associated with reading from said memory means in accordance with a preset magnification factor and outputs a control signal. The clock generating means generates a new clock which depends on the horizontal compression factor of the image from the input write clock. Said combining means combines the control signals from said vertical and horizontal enlargement control means with said read clock to supply the combined signal to said memory means.

If an image having an aspect ratio of 4:3 is displayed on a screen having an aspect ratio of 16:9 with a correct roundness, the frequency of a new read clock is made 4/3 times as high as that of the write clock and the magnification factor is preset 1. Then, the period which is taken to read the same line again from said on a line-by-line basis and the period which is taken to read the same pixel again on a pixel-by-pixel basis would become infinitely great. This means that the read clock will have a frequency which is 4/3 times. The image will be compressed in a horizontal direction and displayed. Therefore, an image having an aspect ratio of 4:3 will be adapted on a screen having a ratio of 16:9.

If a large magnification factor, for example, 4/3 times is preset, the period which is taken for the vertical enlargement control means to read the same line in every four lines again on a line-by-line basis is preset to 4 lines. The horizontal enlargement control means controls so that the same pixel in every four pixels is read. Accordingly, a video signal which is enlarged 4/3 times in both vertical and horizontal directions will be output. A desired magnification factor can be obtained by changing said preset value.

BRIEF DESCRIPTION OF THE DRAWINGS

FIGS. 8A to 8G are explanatory views showing the applications of the embodiment of FIG. 7.

FIGS. 10A to 10D are explanatory views showing applications of the embodiment of FIG. 9.

DETAILED DESCRIPTION

Now, embodiments of the present invention will be described with reference to drawings.

Figure 2:
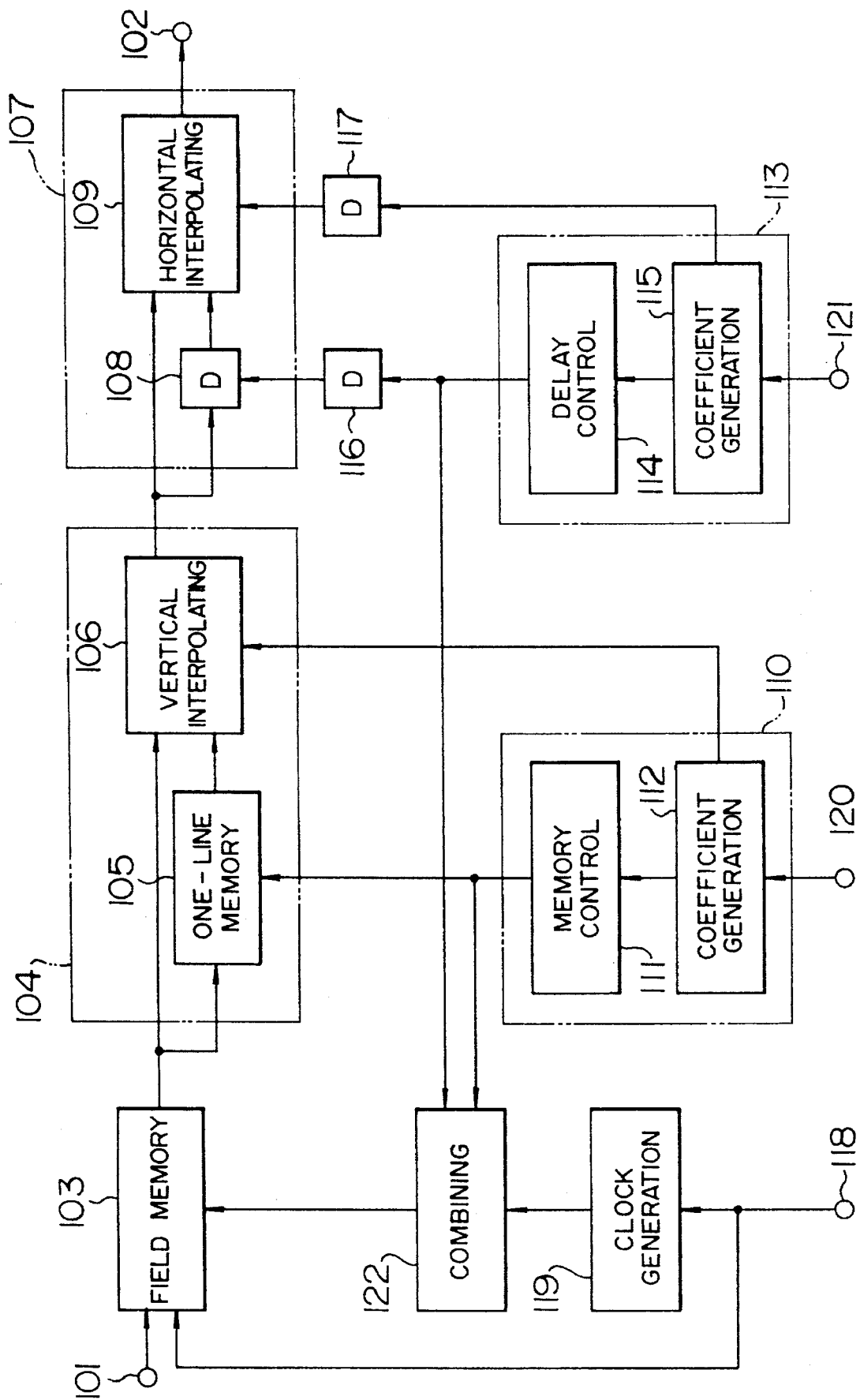
FIG. 2 is a block diagram showing an embodiment of the present invention.

Referring now to FIG. 2, there is shown an embodiment of the present invention. In FIG. 2, a reference numeral 101 denotes an input terminal for digitized video signal; 102 an output terminal for the video signal; 103 a field memory; 104 a vertical interpolating enlarging circuit; 106 a vertical interpolating circuit; 107 a horizontal interpolating enlarging circuit; 108 an image delay circuit; 109 a horizontal interpolating circuit; 110 a vertical enlarging control circuit; 111 a memory control circuit; 112 a vertical interpolation coefficient generating circuit; 113 a horizontal enlarging control circuit; 114 an image delay control circuit; 115 a horizontal interpolation coefficient generating circuit; 116 a first delay circuit; 117 a second delay circuit; 118 an input terminal for a write clock; 119 a read clock generating circuit; 120 an input terminal for a vertical enlarging ratio preset value; 121 an input terminal for a horizontal enlarging ratio preset value and 122 a combining circuit for a memory control signal.

In FIG. 2, an image signal which is input from the input terminal 101 is controlled by a write clock from the input terminal 118 on a line-by-line basis so that it is sequentially written into the field memory 103. The clock generating circuit 119 generates a read clock having a frequency which is about 4/3 times as high as that of the input write clock and supplies it to the field memory 103 via the combining circuit 122. Accordingly, the video signal in which an image is compressed in a horizontal direction will be read from the field memory 103. The vertical enlarging control circuit 110 controls the field memory 103 via the combining circuit 122 for reading the video signal from the field memory 103 with a line period corresponding to a magnification factor. The circuit 110 prohibits writing of the one-line memory 105 included in the vertical enlarging circuit 104 with the same period to provide a line delay output of an output signal of the field memory 103. Manner of this operation is illustrated in FIG. 3.

Figure 3:
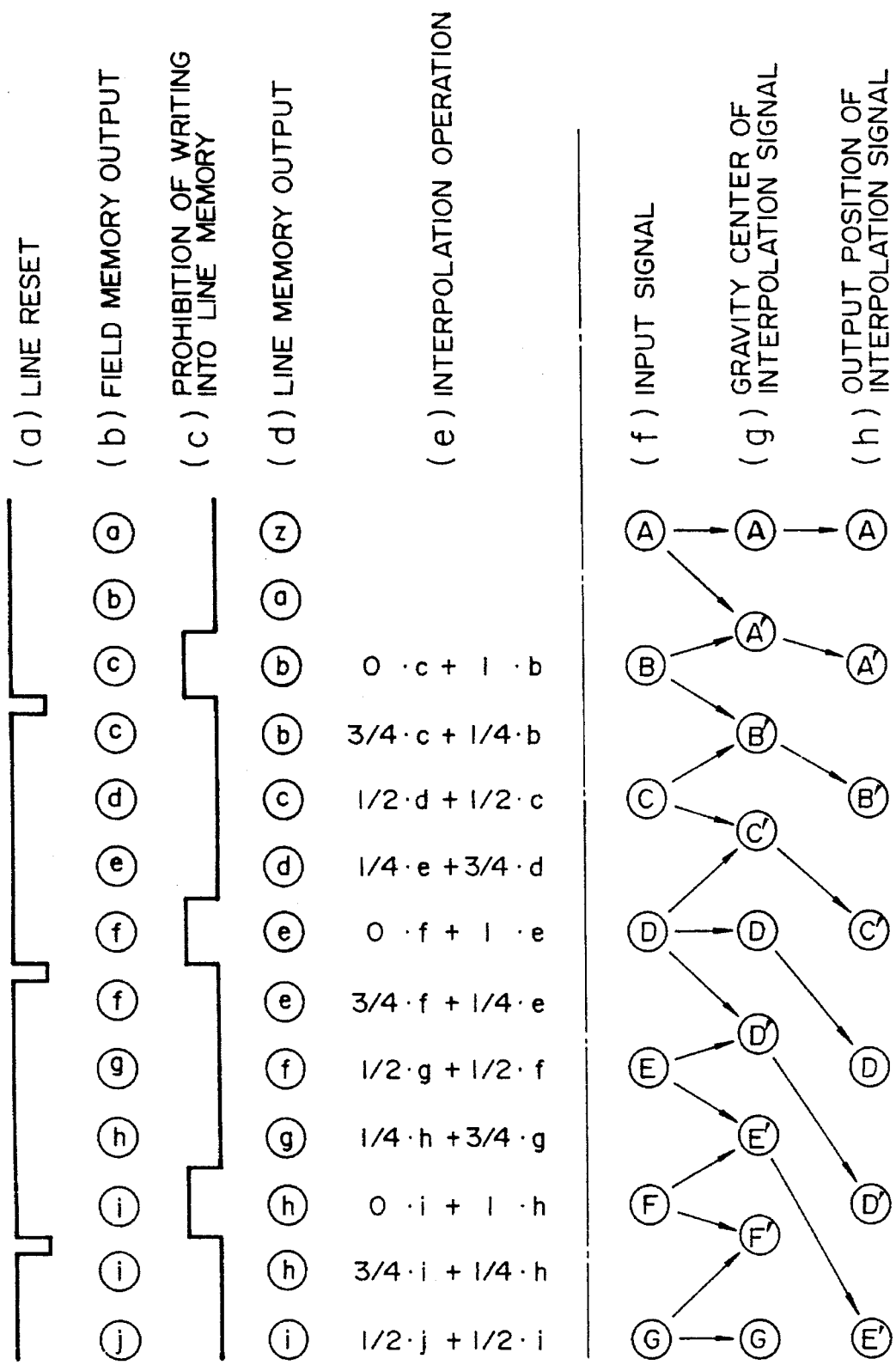
FIG. 3 is an explanatory view illustrating operation of the circuit of FIG. 2 and the principle of the image enlargement.

FIG. 3 is an explanatory view showing control of a scanning line in case where the scanning line is enlarged 4/3 times in a vertical direction.

FIG. 3(b) shows an output signal of the field memory 103. The same scanning line is repeatedly read in synchronization with a line reset (FIG. 3(a)) which is conducted by the memory control circuit 111. The output signal is provided from the one-line memory 105 (FIG. 3(d)) by prohibiting writing of one line before line reset (FIG. 3(a)) in response to a write prohibiting control signal of the one-line memory 105. As a result, signals for upper and lower adjacent two scanning lines are supplied to the vertical interpolating circuit 106. That is, the signals shown in FIGS. 3(b) and 3(a) are necessarily signals for adjacent scanning lines.

The vertical interpolating circuit 106 generates a scanning line signal by an interpolating operation (FIG. 3(e)) in accordance with a control signal from the vertical enlarging control circuit 110.

Figure 1:
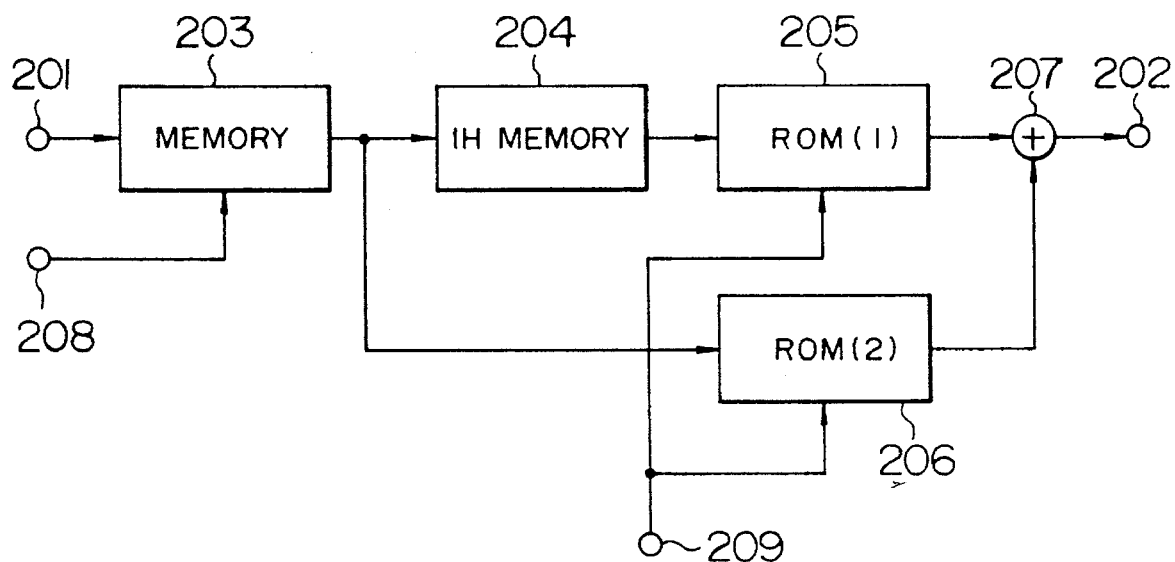
FIG. 1 is a block diagram showing a configuration of the prior art.
Figure 4:
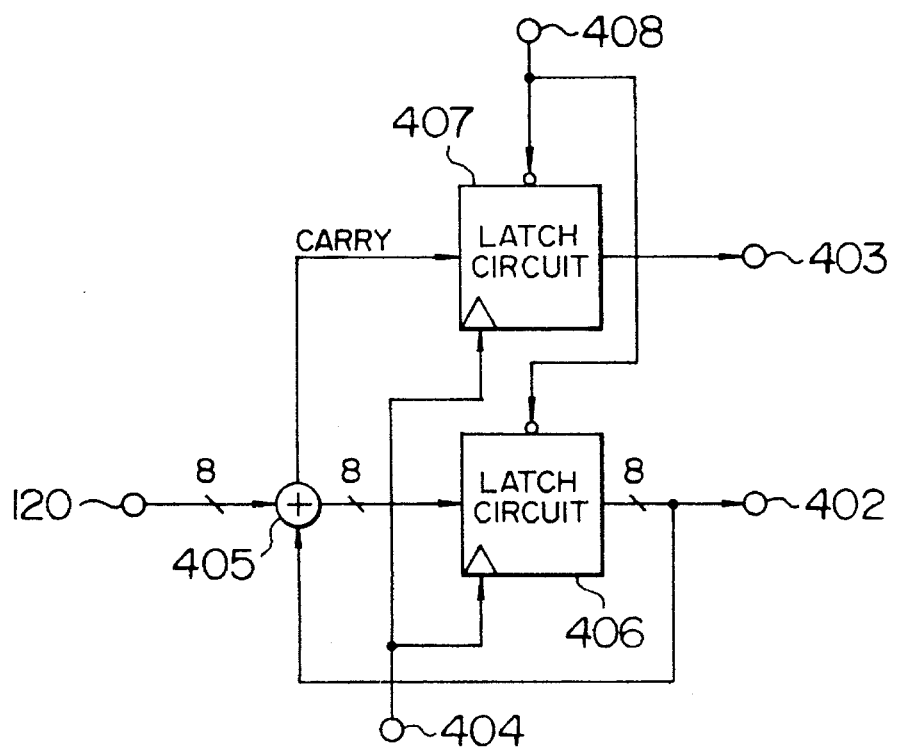
FIG. 4 is a block diagram showing the configuration of a vertical enlargement control circuit of FIG. 2.

Configuration of the vertical enlarging control circuit 110 is shown in FIG. 4. In FIG. 4, a reference numeral 120 denotes an input terminal for an enlargement preset value which is determined in accordance with the magnification factor; 404 an output terminal for an interpolation coefficient; 403 an output terminal for a memory control signal; 404 an input terminal for a pulse having one line period; 405 an adder for adding the interpolation coefficient to the magnification factor preset value input from the input terminal 120; 406 a latch circuit for an output signal of the adder 405; 407 a latch circuit for a carry out signal of the adder 405.

This circuit configuration is designed for 8 bits of the output interpolation coefficient. A new interpolation coefficient in each line can be serially obtained by repeatedly adding the magnification factor preset value with the fed back interpolation coefficient in the adder 405 in accordance with the pulse input from the input terminal 404. At this time, the carry signal for the adder 405 will become a memory control signal for repeatedly reading the same line in the field memory 108. In case of an 8 bit system, the relation between the preset value X of the magnification factor and the actual magnification factor Z can be represented by the formula as follows:

$$Z=256/(256-X)$$

As is apparent from the above mentioned formula, a theoretically desired magnification factor can be obtained by increasing the bit precision.

On the other hand, the scanning line will become a signal having a gravity center in a position of FIG. 3(g) relative to the input video signal shown in FIG. 3(f) (video signal input from the input terminal 101). By displaying this signal in position of FIG. 3(h) of the actual scanning line, a video signal representing an image which is enlarged in a vertical direction can be obtained.

Enlargement in a horizontal direction can be achieved in the same manner as the enlargement in a vertical direction. A delay control signal which is generated by the horizontal enlargement control circuit 113 is fed to the field memory 103 via the combining circuit 122. The field memory is controlled to read the same pixel therefrom again with a period corresponding to the magnification factor in response to the delay control signal so that a video signal representing an image which is enlarged in a horizontal direction is obtained. The horizontal enlarging circuit 107 conducts a horizontal interpolation in accordance with a control signal from the horizontal enlargement control circuit 113 to provide a video signal representing an image which is enlarged in a horizontal direction and balanced in gravity center. Delay circuits 116 and 117 are inserted for adjusting the delay time between the control of the field memory 103 and the control of the pixel delay circuit 108, and the horizontal interpolation circuit 109.

Temporal compression of an image in a horizontal direction and enlargement of an image in vertical and horizontal directions to display the image having an aspect ratio of 4:3 on a screen having an aspect ratio of 16:9 by using the field memory 103 and one-line memory 105, etc. in such a manner in the present embodiment can be conducted by a simple circuit configuration. For example, use of a field memory HM 530281 manufactured by Hitachi Ltd. makes it possible to repeatedly read the same line by using a line reset function to provide a simple control.

Figure 5:
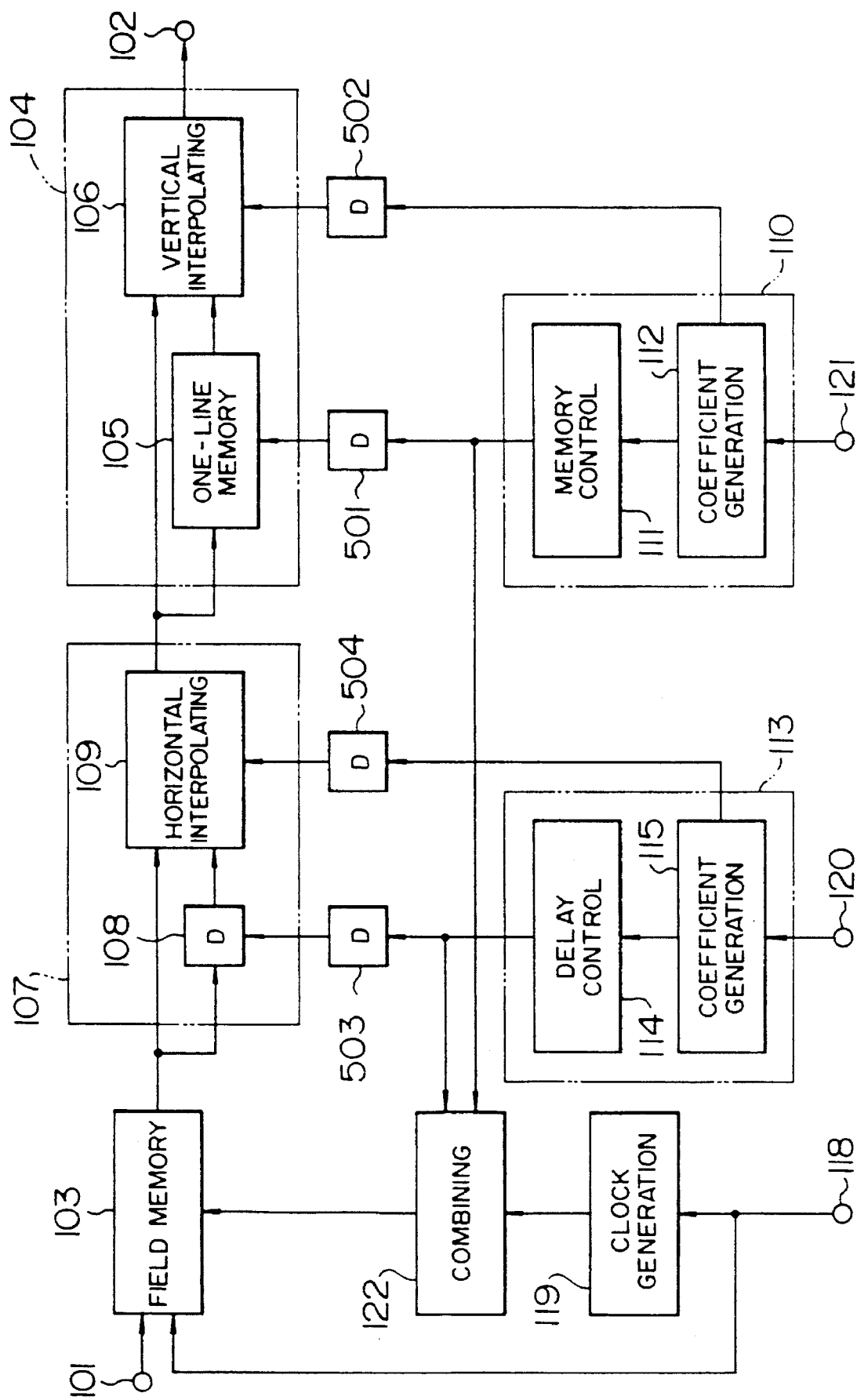
FIG. 5 is a block diagram showing another embodiment of the present invention.

Another embodiment of the present invention is shown in FIG. 5. In FIG. 5, a reference numeral 501 denotes a delay circuit for delaying a control signal for the field memory 103; 502 a delay circuit for an interpolation coefficient; the other components are identical with those of the embodiment of FIG. 2. The present embodiment is different from the embodiment of FIG. 2 only in that enlargement of an image in a vertical direction is conducted in a vertical direction after enlargement in a horizontal direction is conducted in the horizontal enlargement circuit 107. Operation of the circuit in the present embodiment is identical with that of the embodiment of FIG. 2.

The delay periods of time of the delay circuits 503 and 504 are much shorter than those of 116 and 117 of the embodiment of FIG. 2. The scale of the circuit can be advantageously reduced. The delay circuits 501 and 502 are controlled on a line-by-line basis. Accordingly, necessity for delay is almost eliminated by considering the timing of the control signal generation of the vertical enlargement control circuit 110. In other words, adopting of the configuration of the present embodiment provides a circuit having a smaller scale which is capable of compressing and enlarging an image in a desired manner.

Figure 6:
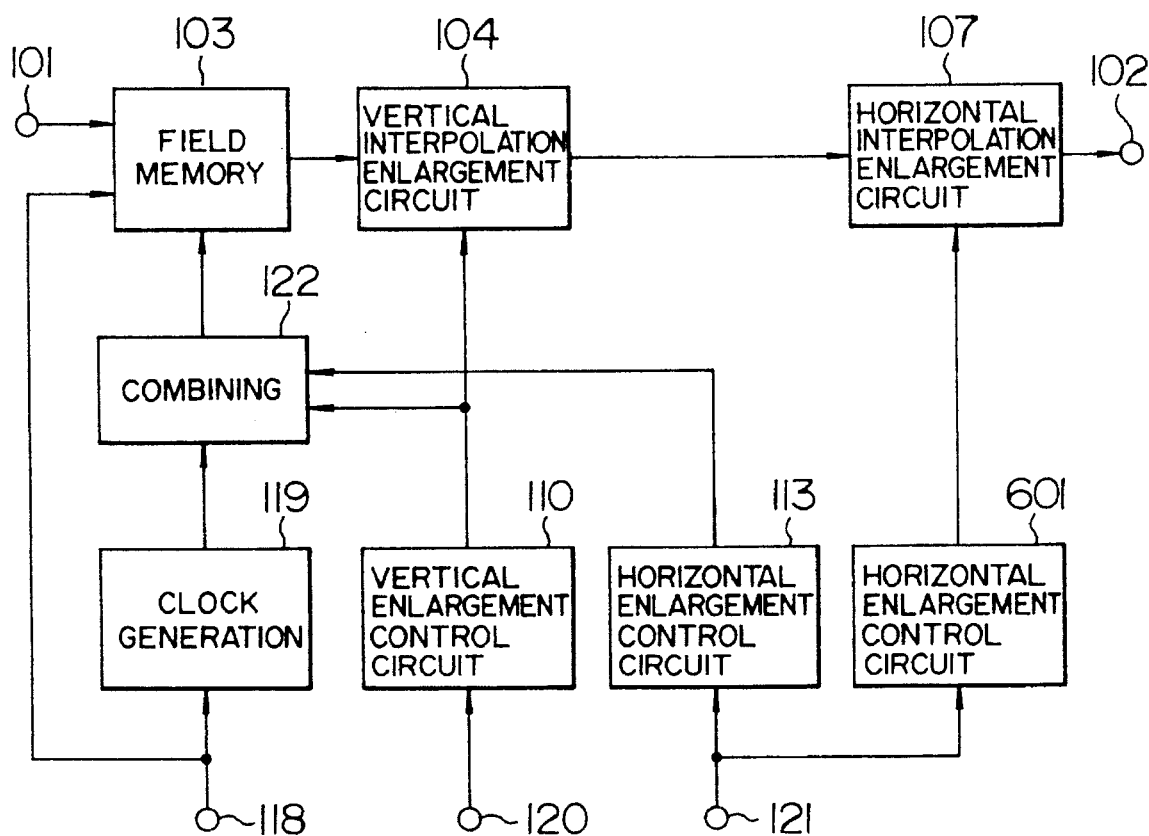
FIG. 6 is a block diagram showing a further embodiment of the present invention.

A further embodiment of the present invention is shown in FIG. 6. In FIG. 6, a reference numeral 601 denotes a second horizontal enlargement control circuit having the same configuration as that of the horizontal enlargement control circuit 113. The other components are identical with those of the embodiment of FIG. 2. The present embodiment is different from the embodiment of FIG. 2 in that it includes a second horizontal enlargement control circuit 601 operating in the same manner as the horizontal enlargement control circuit 113. Operation of the circuit of the present embodiment is identical with that of the embodiment of FIG. 2.

A first enlargement control circuit 113 controls the field memory 103 in accordance with a magnification factor preset value fed from an input terminal 121 to provide a video signal representing an image which is enlarged in a horizontal direction. A second horizontal enlargement control circuit 601 is reset with a time lag which is delayed between the field memory 103 and the horizontal interpolation enlargement circuit 107 relative to the reset timing of the first horizontal enlargement control circuit 113 to provide a delay control signal for controlling the pixel delay circuit 108 in the horizontal interpolating enlarging circuit 107 and a coefficient value for controlling the horizontal interpolating circuit 109.

As a result, the delay circuits 116 and 117 which are necessary in the embodiment of FIG. 2 are eliminated. A most suitable circuit can be formed by choosing a circuit having a smaller scale from either the delay circuits 116 and 117 of FIG. 2 or the second horizontal enlargement control circuit 601 in FIG. 6.

In the above mentioned embodiments, the whole of the image can be compressed or enlarged to a desired size in both vertical and horizontal directions by the vertical enlargement control circuit 110 and the horizontal enlargement control circuit 113. This approach is advantageous in reduction in blanking (no signal) areas on a screen when a laterally elongated image such as letter box type movie image represented by the currently available video signals are displayed on a screen of display having an aspect ratio 16:9. However, for an image having a usual aspect ratio of 4:3, the area of the image which is rendered invisible on the screen by the enlargement is large. Further, for the letter box image, the right and left side areas of the image is rendered invisible by the alignment of the image with the upper and lower sides of the screen and blanking areas are formed on the upper and lower areas of the screen by the alignment of the image to the right and left sides of the screen, creating a disparity feeling between the image signal and the display. It is also reported that a sticking problem occurs on the screen.

An embodiment in which the above mentioned problems are overcome will be described with reference to FIG. 7. The present embodiment is different from the above mentioned embodiment in that the vertical and horizontal enlargement control circuits 110 and 113 are improved.

Figure 7:
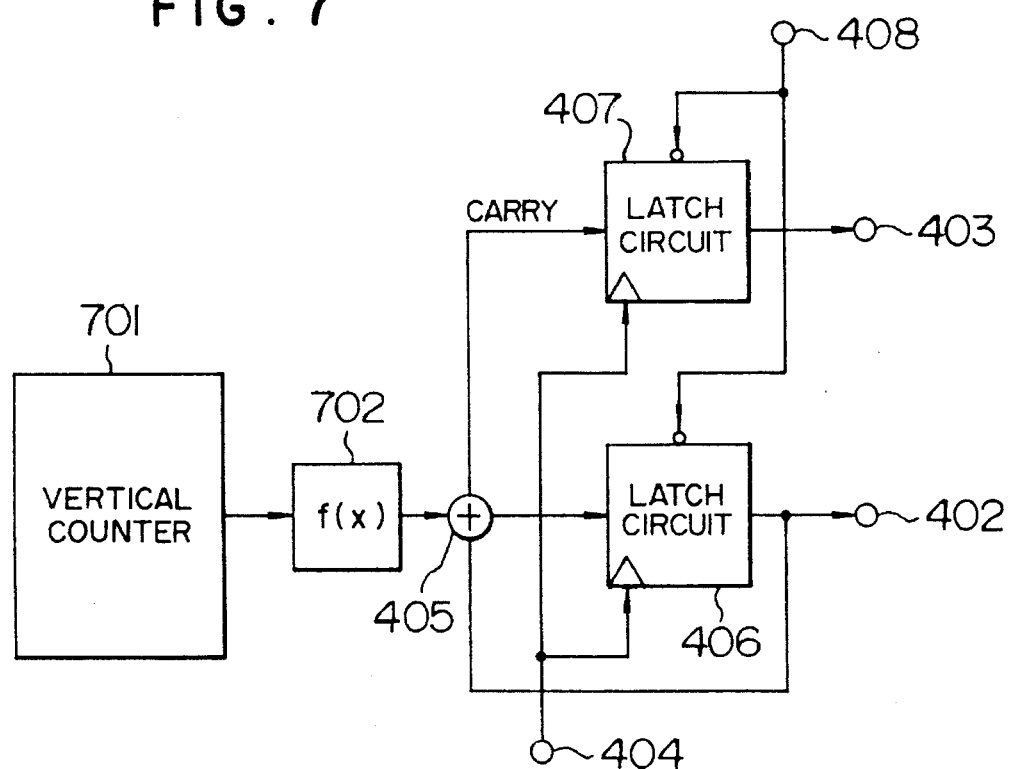
FIG. 7 is a block diagram showing the configuration of the vertical enlargement control circuit in a further embodiment of the present invention.

FIG. 7 is a block diagram showing the configuration of the vertical enlargement control circuit 110.

In FIG. 7, a reference numeral 701 denotes a vertical counter for counting the number of lines on the screen; 702 a numerical value converter for converting the value or count of vertical counter 701 in accordance with a predetermined function. The other components are identical with those in FIG. 4. Since the preset value of the magnification factor from the input terminal 120 in the embodiment of FIG. 4 can be freely converted in accordance with the presetting of the numerical value converter 702 depending upon the location on the screen, a desired area in the image can be enlarged at a desired ratio. The commercial value converter can be formed of logical circuits if the function is simple. For a complicated function, a look-up table system using ROMs, etc. may be adopted. An application in this embodiment is shown in FIG. 8.

FIG. 8(A) shows an image which is represented by a video signal of the current format and is compressed in a horizontal direction and is then displayed on a screen having an aspect ratio of 16:9. The image of the laterally elongated letter box type and its aspect ratio is presumed about 2:1. The whole of the image including blanking areas prior to compression has an aspect ratio of 4:3. FIG. 8B shows an image of FIG. 8A which is enlarged 4/3 times in both vertical and horizontal directions. The size of the image in a horizontal direction is equal to that of the screen having an aspect ratio of 16:9. However, blanking areas are left on the upper and lower side of the screen in this case as mentioned above, giving a feeling that the image is not proper.

FIG. 8C shows a function in the numerical value converter 702 shown in FIG. 7. Ordinate denotes a value (count) of the vertical counter 701 while abscissa denotes a magnification factor. This function provides a magnification factor of 4/3 in the center of the screen and in the vicinity thereof and increases the magnification factor on the upper and lower side areas of the screen and provides an average magnification factor of 3/2 in a vertical direction. Definition of such a function in the numerical value converter 702 provides an image which is displayed on a screen having an aspect ratio of 16:9 without blanking areas. Since the magnification factor in a horizontal direction is equal to that in a vertical direction in the central area on the screen, the image is displayed with a correct roundness. The roundness is changed only in the edges of screen. This hardly gives a feeling of disparity for the image.

FIG. 8E shows an image which is enlarged 3/2 times in both vertical and horizontal directions. The size of the image in a vertical direction is equal to that of the screen having an aspect ratio of 16:9. Some areas of the image in a horizontal direction are lost. In this case, concept of the above mentioned numerical value converter 702 is introduced to the horizontal enlargement control circuit 113. An input signal of the numerical value converter 702 representing the count of the horizontal counter (not shown) and a function determining the magnification factor which decreases on opposite sides of the screen in a horizontal direction will be chosen. If the average magnification factor in a horizontal direction is preset to 4/3 times, the whole of the image can be displayed on a screen having an aspect ratio of 16:9 as shown in FIG. 8G. Also in this case, the image is distorted only at the opposite side areas of the screen in a horizontal direction.

In such a manner, the image can be partially compressed and enlarged by combination of the numerical value converter 702 shown in FIG. 7 with a circuit which is capable of enlarging the image shown in FIG. 2 to a desired size in the present embodiment. Accordingly, an image having an aspect ratio of 4:3 or letter box size image can be displayed on the screen having an aspect ratio of 16:9 without giving rise to any imaging problems.

Figure 9:
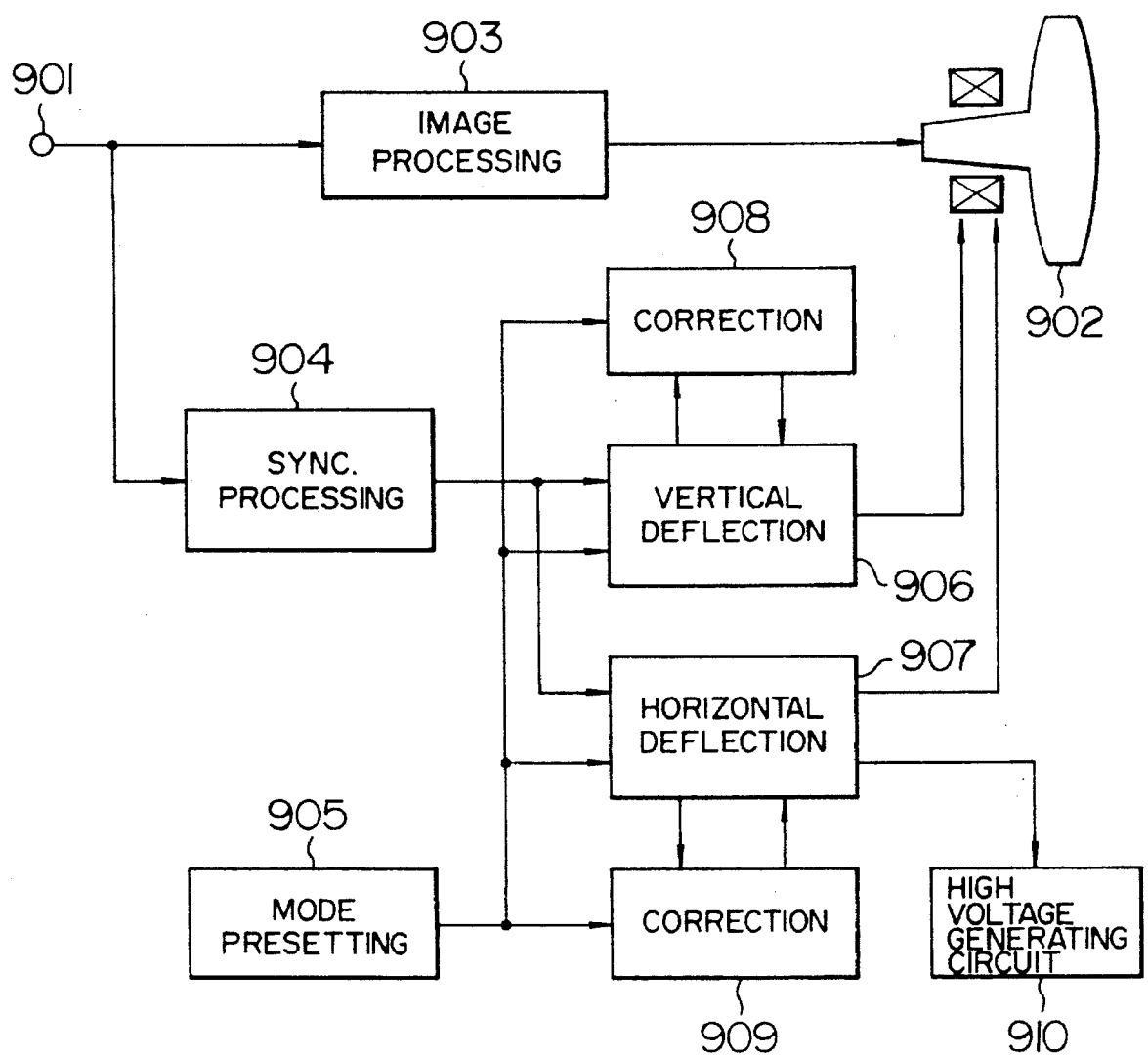
FIG. 9 is a block diagram showing a further embodiment of the present invention.

A further embodiment of the present invention is shown in FIG. 9. In FIG. 9, a reference numeral 901 denotes an input terminal of video signal; 902 a display including a screen having an aspect ratio of 4:3; 903 an image processing circuit for conducting signal processing for input video signal such as Y/C separation and sending the processed signal to the display 902; 904 a synchronization processing circuit for taking a synchronization signal from a video signal; 905 a mode presetting circuit for presetting the enlargement/compression factor of the video signal; 906 a vertical deflection circuit for outputting a vertical deflecting current for driving the display 902 in accordance with a mode specified by the mode presetting circuit 905 from an output signal of the synchronization processing circuit; 906 a horizontal deflection circuit for outputting a horizontal deflecting current for driving the display 902 in accordance with a mode specified by the mode presetting circuit 905 from the output signal of the synchronization processing circuit 904; 908 and 909 first and second deflecting current correcting circuits which correct the deflecting current outputs of the vertical and horizontal deflecting circuits 906 and 907, respectively; and 910 a high voltage generating circuit.

The present embodiment is different from the above mentioned embodiments in that partial compression and enlargement of image is conducted by the deflection circuits and the deflection current correcting circuit. The vertical deflection circuit 906 generates a vertical saw-tooth wave for driving the display 902 in accordance with a vertical deflecting pulse from the synchronization processing circuit 904. Similarly, the horizontal deflection circuit 907 generates a horizontal saw-tooth wave for driving the display 902 in accordance with a horizontal deflecting pulse from the synchronization processing circuit 904. At his time, the vertical and horizontal deflection circuits 906 and 907 change the gradient and the phase of the generated saw-tooth wave. Accordingly, the whole of the image is enlarged in vertical and horizontal directions.

On the other hand, the first and second deflection current correcting circuits 906 and 909 correct the operation of the vertical and horizontal deflection circuits 906 and 907, respectively to give partial distortion to the saw-tooth wave. This correction partially changes the gradient of the saw-tooth wave so that the image have enlargement/compression factor which changes depending upon the location on the screen.

The present embodiment is particularly effective for displaying a letter box type image on a screen having an aspect ratio of 4:3. An application of the embodiment is shown in FIG. 10.

FIG. 10A shows a letter box type image which is displayed on a screen having an aspect ratio of 4:3. Letter box type displays will be adopted in the second generation EDTV systems and are expected to become more popular. In the second generation EDTV systems, high definition information is displayed in upper and lower blanking areas on the screen, it is considered that slight artificiality remains on the screen having an aspect ratio of 4:3. FIG. 8B shows a scheme for reducing the blanking areas by using the vertical and horizontal deflection circuits 906 and 907 to enlarge the whole of image in vertical and horizontal directions. However, there remains a problem that an image is not invisible at the right and left side areas on the screen. FIG. 8C shows an image which is compressed by decreasing the gradient of the horizontal saw-tooth wave on both right and left side thereof by means of the second deflection current correcting circuit 909 is are enlarged by increasing the gradient of the saw tooth wave on the upper and lower sides thereof by means of the first deflection current correcting circuit 908. Accordingly, almost all necessary images can be displayed. FIG. 8D shows the distortion of the displayed image when the display method of FIG. 8C is adopted. No distortion occurs in the center area (a) of the screen and the distortion is largest at the corners (d) of the screen. It hardly matters.

The approach of the present embodiment is also effective for the case in which an image is displayed on a screen having an aspect ratio of 16:9. This approach is comparatively more simple in comparison with the enlargement/compression factor variable approach using the above mentioned digital processing and is effective for the analog type displays.

Since the whole of the image can be compressed or enlarged in order to display the image having an aspect ratio of 4:3 on a screen having a ratio of 16:9, an image which matches the aspect ratio of the screen can be obtained and the image can be displayed on the screen without giving disparity feeling.

Since the image is partially compressed and enlarged, a problem that the image is partially lost by the enlargement of the whole of the image and blanking areas are remained can be solved. An image which matches with the aspect ratio of the screen can be obtained. As a result, sticking problem can be prevented from occurring.

In any cases, the invention can be embodied with a small circuit scale.

What is claimed is:

1. A television receiver capable of enlarging and compressing an image comprising:

a memory having a storage capacity not less than a given value which is controlled with at least a line period;

a clock generator generating a clock having a frequency not less than that of a write clock signal from a writing clock for writing a video signal in said memory and for outputting a read clock for reading said written video signal from said memory;

a vertical enlargement controller generating and outputting a signal for controlling said memory to repeatedly read the same line with a line period depending upon a first preset value when said video signal is read from said memory;

a horizontal enlargement controller generating and outputting a signal for controlling said memory to repeatedly read the same pixel from said memory with a predetermined pixel period depending upon a second preset value when said video signal is read from said memory;

means for combining the output signal from said vertical enlargement controller, the output signal from said horizontal enlargement controller and the read clock from said clock generator and for supplying said memory with a combined signal; to thereby provide a video signal representing an image which is compressed and enlarged in horizontal and vertical directions to a desired size as a video signal read from said memory.

2. A television receiver capable of enlarging and compressing an image as defined in claim 1, in which said vertical enlargement controller generates and outputs an interpolation coefficient depending upon said first preset value as well as the signal for controlling said memory, said horizontal enlargement controller generates and outputs an interpolation coefficient depending upon said second preset value as well as the signal for controlling said memory, the television receiver further including a circuit at a stage downstream of said memory, including a line memory for delaying said video signal read from said memory by one line and outputting it, the operation of said line memory being controlled in accordance with the output signal from said vertical enlargement controller;

vertical interpolator generating and outputting an interpolation signal in accordance with an interpolation coefficient output from said vertical enlargement controller by using said video signal read from said memory and the output signal from said line memory;

means for delaying and outputting the signal and the interpolation coefficient output from said horizontal enlargement controller;

pixel delay means for delaying the output signal from said vertical interpolator, the operation of said pixel delay means being controlled in accordance with the output signal from said means for delaying; and horizontal interpolator generating and outputting a horizontal interpolation signal in accordance with the interpolation coefficient output from said means for delaying by using output signals from said vertical interpolator and said pixel delay means.

3. A television receiver capable of enlarging and compressing an image as defined in claim 1, in which said vertical enlargement controller generates and outputs an interpolation coefficient depending upon said first preset value as well as the signal for controlling said memory, said horizontal enlargement controller generates and outputs an interpolation coefficient depending upon said second preset value as well as the signal for controlling said memory, the television receiver further including a circuit at a stage downstream of said memory, including, first means for delaying and outputting the signal and the interpolation coefficient output from said horizontal enlargement controller, pixel delay means for delaying by one pixel said video signal read from said memory and for outputting it, the operation of said pixel delay means being controlled in accordance with an output signal from said first means for delaying;

horizontal interpolator generating and outputting an interpolation signal in accordance with the interpolation coefficient output from said first means for delaying by using said video signal read from memory and the output signal from said pixel delay means;

a second means for delaying and outputting the signal and the interpolation coefficient output from said vertical enlargement controller;

a line memory delaying by one line the output signal from said horizontal interpolator, the operation of said line memory being controlled in accordance with the output signal from said second means for delaying; and a vertical interpolator generating and outputting a vertical interpolation signal in accordance with the interpolation coefficient output from said second means for delaying by using the output signals from said horizontal interpolator and the output signal from said line memory.

4. A television receiver capable of enlarging and compressing an image as defined in claim 1, in which said vertical enlargement controller generates and outputs an interpolation coefficient depending upon said first preset value as well as the signal for controlling said memory, said receiver further comprising a line memory delaying said video signal read from said memory by one line and outputting it, the operation of said line memory being controlled in accordance with the output signal from said vertical enlargement controller;

vertical interpolator generating and outputting an interpolation signal in accordance with an interpolation coefficient output from said vertical enlargement controller by using said video signal read from said memory and the output signal from said line memory;

pixel delay means for delaying the output signal from said vertical interpolator;

second horizontal enlargement controller generating and outputting a signal for controlling said pixel delay means at intervals of a pixel period corresponding to said second preset value and for generating and outputting an interpolation coefficient corresponding to said second preset value; and horizontal interpolator generating and outputting an interpolation signal in accordance with the interpolation coefficient output from said first means for delaying by using output signals from said vertical interpolator and said pixel delay means.

5. A television receiver capable of enlarging and compressing an image according to claim 2, 3 or 4, wherein said vertical enlargement controller comprises:

a vertical position generator generating a value in accordance with the vertical position;

value converter consecutively converting the output from said vertical position generator;

a first register;

an adder adding the output from said value converter with the output from said first register to supply the sum to the first register; and a second register storing a carry output from said adder, whereby the output of said first register is output as said interpolation coefficient of the vertical enlargement controller and the output of said second register is output as a signal controlling said memory and the line memory to partially change the magnification rate of said image in a vertical direction.

6. A television receiver capable of enlarging and compressing an image according to claim 2, 3 or 4, wherein said horizontal enlargement controller comprises:

a horizontal position generator generating a value in accordance with the horizontal position;

a value converter consecutively converting the count output from said horizontal position;

a first register;

an adder adding the output from said value converter with the output from said first register to supply the sum to said first register; and a second register storing a carry output from said adder;

whereby the output of said first register is output as said interpolation coefficient of the horizontal enlargement controller and the output of said second register is output as a signal controlling said memory and the pixel delay means to partially change the magnification rate of said image in a horizontal direction.

* * * * *